United States Patent
Fonville et al.

(10) Patent No.: US 9,909,667 B2
(45) Date of Patent: Mar. 6, 2018

(54) SEAL FOR PRESSURIZED FLUID AND OPEN INTERFACE GAP

(71) Applicant: GM Global Technology Operations LLC, Detroit, MI (US)

(72) Inventors: Carl E. Fonville, Ann Arbor, MI (US); Curt R. Danielewicz, Macomb, MI (US); David M. Miller, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/814,970

(22) Filed: Jul. 31, 2015

(65) Prior Publication Data
US 2017/0030466 A1 Feb. 2, 2017

(51) Int. Cl.
*F16J 15/10* (2006.01)
*F16J 15/02* (2006.01)
*F16J 15/12* (2006.01)
*F16J 15/16* (2006.01)

(52) U.S. Cl.
CPC .......... *F16J 15/104* (2013.01); *F16J 15/022* (2013.01); *F16J 15/121* (2013.01); *F16J 15/166* (2013.01)

(58) Field of Classification Search
CPC .......... F16J 15/104; F16J 15/06; F16J 15/061; F16J 15/062; F16J 15/025; F16J 15/0887; B32B 27/04
See application file for complete search history.

(56) References Cited

U.S. PATENT DOCUMENTS

| 3,520,541 | A | * | 7/1970 | Rohani | F16J 15/025 277/619 |
| 4,034,994 | A | * | 7/1977 | Ohta | B29C 57/025 138/109 |
| 4,299,412 | A | * | 11/1981 | Parmann | B29C 57/025 285/110 |
| 4,789,167 | A | * | 12/1988 | Housas | F16L 17/035 277/616 |
| 6,224,058 | B1 | * | 5/2001 | Drebing | F16J 15/025 277/313 |

(Continued)

FOREIGN PATENT DOCUMENTS

| DE | 10019567 A1 | 10/2001 |
| DE | 10220399 A1 | 11/2003 |

OTHER PUBLICATIONS

German Office Action dated Apr. 24, 2017.
Chinese Office Action dated Sep. 20, 2017.

*Primary Examiner* — Eugene G Byrd
(74) *Attorney, Agent, or Firm* — Harness Dickey & Pierce, P.L.C.

(57) ABSTRACT

A seal is adapted to be received in an annular groove in a first member and is compressed against a groove bottom by a second member that defines a gap between the first and second members. The seal includes a reinforcement member and an elastomer body over-molded on the reinforcement member. The reinforcement member is disposed on an outboard side of the elastomer body and the elastomer body extends both above and below the reinforcement member. The compression of the seal causes the elastomer body to deform such that the reinforcement member provides a reinforcement substantially along the entire gap to prevent the elastomer body of the seal from being extruded through the gap.

3 Claims, 1 Drawing Sheet

(56) References Cited

U.S. PATENT DOCUMENTS

| | | | |
|---|---|---|---|
| 6,814,358 B2* | 11/2004 | Keck | F16J 15/121 |
| | | | 277/611 |
| 2003/0030235 A1* | 2/2003 | Cipolla | F16J 15/104 |
| | | | 277/630 |
| 2003/0090069 A1 | 5/2003 | Keck | |
| 2004/0188953 A1* | 9/2004 | Fonville | F16J 15/061 |
| | | | 277/603 |
| 2004/0239047 A1* | 12/2004 | Kent | F16J 15/064 |
| | | | 277/628 |
| 2005/0224119 A1* | 10/2005 | Okamoto | F16J 15/104 |
| | | | 137/625.69 |
| 2008/0018058 A1* | 1/2008 | Kobayashi | F16J 15/062 |
| | | | 277/650 |
| 2008/0303224 A1* | 12/2008 | Knapp | F16L 25/0054 |
| | | | 277/627 |
| 2009/0174152 A1* | 7/2009 | Muramatsu | F16J 15/062 |
| | | | 277/562 |
| 2010/0194049 A1* | 8/2010 | Kocurek | E21B 33/03 |
| | | | 277/314 |
| 2011/0076848 A1* | 3/2011 | Datta | B01J 3/03 |
| | | | 438/689 |
| 2011/0227295 A1* | 9/2011 | Watanabe | F02F 11/002 |
| | | | 277/591 |
| 2011/0232843 A1* | 9/2011 | Bowman | F16J 15/062 |
| | | | 156/345.1 |
| 2011/0278839 A1* | 11/2011 | Danielewicz | F16J 15/106 |
| | | | 285/335 |
| 2012/0175848 A1* | 7/2012 | Leonard | F16J 15/104 |
| | | | 277/624 |
| 2012/0181756 A1* | 7/2012 | Fonville | F16J 15/3204 |
| | | | 277/644 |

* cited by examiner

SEAL FOR PRESSURIZED FLUID AND OPEN INTERFACE GAP

FIELD

The present disclosure relates to a seal for sealing a gap under pressure.

BACKGROUND

This section provides background information related to the present disclosure which is not necessarily prior art.

Seals that span a gap under pressure can tend to destabilize at the joint. A destabilized seal can disengage from a sealing surface and allow air to enter the system. The leakage of lubricant and/or the introduction of air into the system can cause foaming of the oil which can result in spun bearings and collapsed lifters due to the air in the oil system. The industry recommended maximum gap distance for a seal is 0.8 mm. Accordingly, and is desirable to provide a seal that is capable of reliably sealing a gap in excess of 0.8 mm so that manufacturing tolerances and other variances can be accommodated for without risk of seal failure.

SUMMARY

This section provides a general summary of the disclosure, and is not a comprehensive disclosure of its full scope or all of its features.

A seal system includes a first member defining a groove in a first surface, said groove having a depth in a direction perpendicular to the first surface and a width in a direction parallel to the first surface. A second member includes a second surface that opposes the first surface with a joint gap between the first surface and the second surface. A seal is disposed in the annular groove and including a reinforcement member and an elastomer body overmolded on the reinforcement member. The reinforcement member has a cross section with a first height in a direction perpendicular to the first surface and a first width in a direction parallel to the first surface, wherein in an uninstalled condition the elastomer body has a cross section with a second height in the direction perpendicular to the first surface and a second width in the direction parallel to the first surface. The elastomer body includes a first surface facing the second member and extending beyond a first surface of the reinforcement member that faces the second member by a first distance. The elastomer body further includes a second surface facing a bottom of the groove and extending beyond a second surface of the reinforcement member facing a bottom of the groove by a second distance that is greater than the first distance. In an installed condition, the elastomer body is deformed by the second member so that the reinforcement member is in contact with the second member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
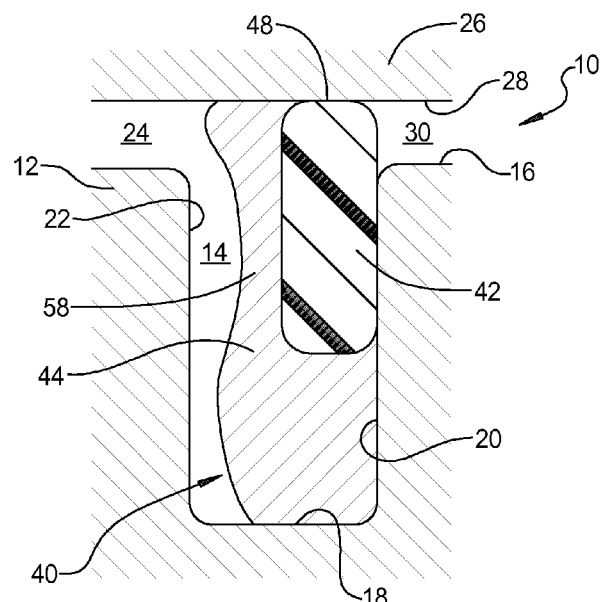
FIG. 1 is a cross-sectional view of a seal system according to the principles of the present disclosure.
Figure 2:
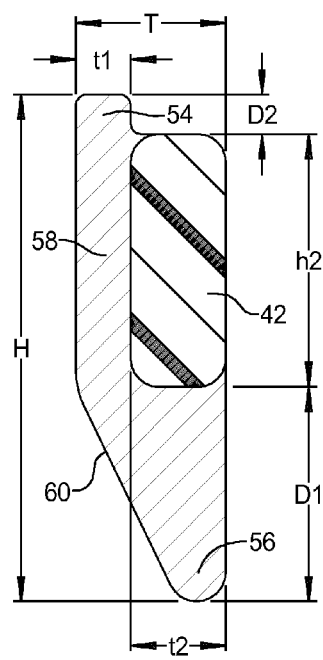
FIG. 2 is a cross-sectional view of a seal member according to the principles of the present disclosure shown in an uninstalled condition.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a seal system 10 is shown including a first member 12 defining a groove 14 in a first surface 16. The groove 14 includes a groove bottom 18, a groove outer sidewall 20 and a groove inner sidewall 22. The groove 14 can define a completed or partially completed annular shape with the groove outer sidewall 20 disposed on an outer perimeter side of the groove 14 relative to a pressurized interior space 24 in which an oil is maintained. The seal system 10 includes a second member 26 having a second surface 28 opposing the first surface 16. A gap 30 is defined between the first surface 16 and the second surface 28 in the installed condition.

Figure 3:
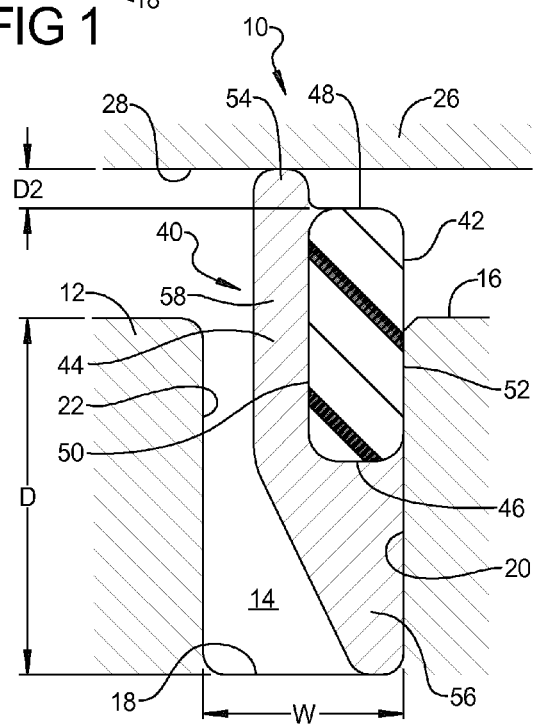
FIG. 3 is a cross-sectional view of the seal system shown in an uninstalled condition.

A seal member 40 is disposed in the annular groove 14 and includes a reinforcement member 42 and an elastomer body 44 over-molded on the reinforcement member 42. The reinforcement member 42 can include a lower surface 46 and an upper surface 48 relative to the groove bottom 18 as well as an inner surface 50 opposing the groove inner sidewall 22 and an outer surface 52 opposing the groove outer sidewall 20 such that the inner surface 50 faces the interior space 24 and the outer surface 52 faces away from the interior space 24. The elastomer body 44 of the seal member 40, in an uninstalled condition (FIG. 3), includes an upper portion 54 that extends above the upper surface 48 of the reinforcement member 42 and is laterally offset from the reinforcement member 42 toward the interior space 24. The elastomer body 44 of the seal member 40, in an uninstalled condition (FIG. 3), includes a lower portion 56 that extends below the lower surface 46 of the reinforcement member 42. The lower portion 56 can be overlapping with the lower surface 46 of the reinforcement member 42. A main body portion 58 extends between the upper portion 54 and the lower portion 56 on the inner surface 50 of the reinforcement member 42. The upper surface 48 and outer surface 52 of the reinforcement member 42 can be free from any elastomer over mold or optionally can be provided with a thin layer of elastomer in order to enhance the bonding between the reinforcement member 42 and the elastomer body 44.

In an installed condition (FIG. 1), the second member 26 is secured to the first member 12 with the seal member 40 disposed within the annular groove 14 so that the elastomer body 44 is compressed between the second surface 28 of the second member 26 and the groove bottom 18 of the groove 14 in the first member 12. The compressed seal member 40 extends across the gap 30 between the first surface 16 of the first member 12 and the second surface 28 of the second member 26. In the installed condition, the upper portion 54 of the elastomer body 44 is compressed downward relative to the groove bottom 18, such that the upper surface 48 of the reinforcement member 42 substantially contacts the second surface 28 of the second member 26. The phrase "substantially contacts" is intended to encompass the upper surface 48 of the reinforcement member 42 is either directly contacting the second surface 28 or can have a thin overmolded elastomer layer that directly contacts the second surface 28. The phrase "thin overmolded elastomer layer" is intended to include a layer of elastomer overmold that has a thickness that is less than half a height distance D2 that the upper portion 54 extends above the upper surface 48 of the reinforcement member 42. The compression of the upper portion 54 and the lower portion 56 provides pre-loading to insure a tight seal along the groove bottom 18 and the second surface 28 of the second member 26. The reinforcement member 42 provides a reinforcement backing to the elastomer body substantially along the gap space 30 to prevent the elastomer body from being extruded through the gap 30 when subjected to high pressure loads.

The following dimensions are provided for exemplary purposes and are not intended to limit the interpretation or scope of the claims unless explicitly recited therein. According to a sample embodiment, the seal member 40 in an uninstalled condition can have a height H of 10.4 mm and a thickness T of 2.8 mm. The lower portion 56 of the elastomer body 44 can extend below the lower surface 46 of the reinforcement member 42 by a distance D1 of 4.8 mm while the upper portion 54 of the elastomer body 44 can extend above the upper surface 48 of the reinforcement member 42 by a distance D2 of 0.6 millimeter. The upper portion 54 of the elastomer body 44 can have a thickness t1 of 0.8 mm. The lower portion 56 of the elastomer body 44 can have a tapering inner surface 60 that tapers radially outward from the main body portion 58 toward a distal end of the lower portion 56.

The reinforcement member 42 can have a height h2 of 5 mm and a thickness t2 of 2 mm. The groove 14 can have a width W of 4 mm and a depth D of 7.7 mm. The reinforcement member 42 can be made of a plastic, metal or other material. If made from plastic, the plastic can be reinforced with embedded fibers.

It is noted that a seal system 10 having the above-identified dimensions was tested with the first member 12 and second member 26 having a gap 30 ranging from 0.8 mm to 2.5 mm and was capable of withstanding internal pressures cycled between 0 and 5000 kPa (and held there for a few seconds) several times per minute without failure. Based upon these test results, it is believed that the following dimensional relationships are particularly relevant to the disclosed seal system. The height h2 of the reinforcement member is preferably at least two times the gap width. Accordingly, for a gap width of 0.8 mm the height h2 of the reinforcement member is preferably at least 1.6 mm. For a gap width of 2.5 mm, the height h2 of the reinforcement member is preferably at least 5.0 mm. It is noted that the groove depth, groove width and reinforcement member thickness can also affect the dimensional relationship between the gap width and reinforcement member height. Preferably, the upper portion 54 has a height dimension D2 above the upper surface 48 of the reinforcement member 42 in an uninstalled condition that is at least half of a gap distance of the gap 30 between the first and second members 12, 26. The upper portion also preferably has a width dimension t1 that is dependent on the sealing contact width design requirement and the height D2 should be a height that is required to generate the sealing pressure within that feature in order to meet the design requirement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal system comprising:
a first member defining an annular groove in a first surface, said annular groove having a depth in a direction perpendicular to the first surface and a width in a direction parallel to the first surface;
a second member including a second surface opposing the first surface with a joint gap between the first surface and the second surface so that the first surface is spaced from the second surface in an installed position; and
a seal is received in the annular groove in the first member and is compressed against a groove bottom by the second member that defines the joint gap having a gap distance between the first and second members, the seal includes a plastic reinforcement member and an elastomer body over-molded on the plastic reinforcement member, the plastic reinforcement member is disposed on an outboard side of the elastomer body and the elastomer body extends both above and below the plastic reinforcement member, wherein in an installed condition, the compression of the seal between the first and second members causes the elastomer body to deform such that the plastic reinforcement member provides a reinforcement of the elastomer body substantially along the entire gap distance to prevent the elastomer body of the seal from being extruded through the gap space, wherein in the installed condition, the plastic reinforcement member substantially contacts the second opposing surface of the second member, wherein in an uninstalled condition, the elastomer body includes an upper portion that extends above an upper surface of the plastic reinforcement member and is laterally inwardly offset relative to the upper surface of the plastic reinforcement member, wherein the upper portion has a height dimension above the upper surface of the plastic reinforcement member in the uninstalled condition that is at least half of the gap distance of the joint gap between the first and second members.

2. The seal system according to claim 1, wherein the upper portion has a height dimension above the upper surface of the plastic reinforcement member that is less than a width dimension of the upper portion.

3. The seal system according to claim 1, wherein the elastomer body includes a lower portion that extends below a lower surface of the plastic reinforcement member and includes a tapering inner surface that tapers radially outward from a main body toward a distal end of the lower portion.

* * * * *

UNITED STATES PATENT AND TRADEMARK OFFICE
CERTIFICATE OF CORRECTION

PATENT NO. : 9,909,667 B2  Page 1 of 1
APPLICATION NO. : 14/814970
DATED : March 6, 2018
INVENTOR(S) : Carl E. Fonville, Curt R. Danielewicz and David M. Miller It is certified that error appears in the above-identified patent and that said Letters Patent is hereby corrected as shown below:

On the Title Page

Item (72) Inventors: Add --Steven E. Wallace, Flushing, MI (US)--

Signed and Sealed this
Fifth Day of June, 2018

Andrei Iancu
*Director of the United States Patent and Trademark Office*